US011226987B2

(12) United States Patent
Ramaiyer et al.

(10) Patent No.: US 11,226,987 B2
(45) Date of Patent: Jan. 18, 2022

(54) SYSTEM AND METHOD FOR IN-PLACE DATA WRITES TO REDUCE FRAGMENTATION IN A MULTIDIMENSIONAL DATABASE ENVIRONMENT

(71) Applicant: ORACLE INTERNATIONAL CORPORATION, Redwood Shores, CA (US)

(72) Inventors: Kumar Ramaiyer, Cupertino, CA (US); Young Joon Kim, Stanford, CA (US); Haritha Gongalore, Saratoga, CA (US); Vilas Ketkar, San Jose, CA (US); Shubhagam Gupta, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 208 days.

(21) Appl. No.: 15/332,969

(22) Filed: Oct. 24, 2016

(65) Prior Publication Data
US 2017/0116215 A1    Apr. 27, 2017

Related U.S. Application Data

(60) Provisional application No. 62/245,915, filed on Oct. 23, 2015.

(51) Int. Cl.
*G06F 16/00*    (2019.01)
*G06F 16/28*    (2019.01)
(Continued)

(52) U.S. Cl.
CPC ........ *G06F 16/283* (2019.01); *G06F 16/2282* (2019.01); *G06F 16/23* (2019.01)

(58) Field of Classification Search
CPC combination set(s) only.
See application file for complete search history.

(56) References Cited

U.S. PATENT DOCUMENTS 5,359,724 A * 10/1994 Earle .................... G06F 12/0207
5,574,952 A * 11/1996 Brady .................... G06F 3/0601
                                                                    341/95

(Continued)

FOREIGN PATENT DOCUMENTS

CA         2202217 A1 *   5/1998   ......... G06F 16/2255

OTHER PUBLICATIONS

Iankovszky, Andra et al., Edgewater Ranzal, Oracle Platinum Consulting Partner, "The Uncharted Territory Ready to be Discovered: Hybrid Essbase", Hyperion UKOUG, Jun. 18, 2015, 24 pages.

(Continued)

*Primary Examiner* — Augustine K. Obisesan
(74) *Attorney, Agent, or Firm* — Tucker Ellis LP

(57) ABSTRACT

In accordance with an embodiment, described herein is a system and method for use with a multidimensional database computing environment. Particularly, a system and method are described for performing in-place data writes to a data storage medium associated with the multidimensional database computing environment. For example, when multiple data updates from calculation scripts are associated with a same set of blocks, the in-place data enable the system to reduce fragmentation of the data storage medium, and also to reduce contention due to index updates.

14 Claims, 6 Drawing Sheets

(51) Int. Cl.
*G06F 16/22* (2019.01)
*G06F 16/23* (2019.01)

(56) References Cited

U.S. PATENT DOCUMENTS

| | | | |
|---|---|---|---|
| 5,915,129 A * | 6/1999 | Slivka | G06F 12/0804 |
| | | | 707/E17.01 |
| 6,058,392 A * | 5/2000 | Sampson | G06F 16/2255 |
| 6,161,105 A | 12/2000 | Keighan | |
| 6,574,720 B1 | 6/2003 | Hopeman | |
| 6,629,102 B1 | 9/2003 | Malloy | |
| 6,766,325 B1 | 7/2004 | Pasumansky | |
| 7,133,876 B2 | 11/2006 | Roussopoulos | |
| 7,392,242 B1 | 6/2008 | Baccash | |
| 8,156,083 B2 | 4/2012 | Banerjee | |
| 10,083,195 B2 | 9/2018 | Zhou | |
| 10,318,498 B2 | 6/2019 | Tran | |
| 10,346,435 B2 | 7/2019 | Walker | |
| 10,360,527 B2 | 7/2019 | Abe | |
| 10,467,251 B2 | 11/2019 | Menon | |
| 2002/0029207 A1 | 3/2002 | Bakalash | |
| 2003/0005420 A1 | 1/2003 | Ghosh | |
| 2004/0054858 A1* | 3/2004 | Chandrasekaran | G06F 3/0608 |
| | | | 711/154 |
| 2005/0071349 A1* | 3/2005 | Jordan | G06F 17/30592 |
| 2005/0262108 A1 | 11/2005 | Gupta | |
| 2006/0010159 A1 | 1/2006 | Mirchandani | |
| 2006/0085742 A1 | 4/2006 | Harold | |
| 2006/0106769 A1 | 5/2006 | Gibbs | |
| 2006/0212672 A1* | 9/2006 | Chandrasekaran | G06F 3/0608 |
| | | | 711/171 |
| 2006/0271568 A1 | 11/2006 | Balkir | |
| 2007/0027674 A1 | 2/2007 | Parson | |
| 2007/0061344 A1 | 3/2007 | Dickerman | |
| 2007/0088691 A1 | 4/2007 | Dickerman | |
| 2007/0094668 A1 | 4/2007 | Jacquot | |
| 2008/0288524 A1 | 11/2008 | Dumitru | |
| 2009/0030915 A1 | 1/2009 | Winter | |
| 2009/0037499 A1* | 2/2009 | Muthulingam | G06F 3/061 |
| 2009/0248651 A1 | 10/2009 | Perry | |
| 2009/0249125 A1 | 10/2009 | Bhatawdekar | |
| 2009/0276705 A1 | 11/2009 | Ozdemir | |
| 2010/0169274 A1* | 7/2010 | Kulkarni | G06F 16/2228 |
| | | | 707/609 |
| 2010/0174879 A1* | 7/2010 | Pawar | G06F 3/0608 |
| | | | 711/161 |
| 2012/0296883 A1* | 11/2012 | Ganesh | G06F 17/30315 |
| | | | 707/693 |
| 2013/0262394 A1* | 10/2013 | Kumarasamy | G06F 16/11 |
| | | | 707/673 |
| 2014/0046920 A1* | 2/2014 | Shuma | G06F 16/00 |
| | | | 707/705 |
| 2014/0052764 A1* | 2/2014 | Michael | G06F 17/30221 |
| | | | 707/822 |
| 2014/0122413 A1 | 5/2014 | Presti | |
| 2015/0317334 A1* | 11/2015 | Raghunathan | G06F 16/21 |
| | | | 707/743 |
| 2017/0116032 A1 | 4/2017 | Tran | |
| 2017/0116215 A1 | 4/2017 | Ramaiyer | |
| 2017/0116281 A1 | 4/2017 | Roytman | |
| 2017/0116290 A1 | 4/2017 | Reichman | |
| 2017/0116309 A1 | 4/2017 | Menon | |
| 2017/0116310 A1 | 4/2017 | Walker | |
| 2017/0116311 A1 | 4/2017 | Reichman | |
| 2017/0116312 A1 | 4/2017 | Reichman | |
| 2017/0116313 A1 | 4/2017 | Roytman | |
| 2017/0308315 A1* | 10/2017 | Wang | G06F 3/0608 |
| 2019/0073366 A1 | 3/2019 | Raimaiyer | |
| 2019/0079959 A1 | 3/2019 | Raimaiyer | |
| 2019/0102445 A1 | 4/2019 | Raimaiyer | |
| 2019/0102446 A1 | 4/2019 | Raimaiyer | |
| 2019/0102447 A1 | 4/2019 | Raimaiyer | |
| 2019/0258612 A1 | 8/2019 | Tran | |
| 2019/0286638 A1 | 9/2019 | Walker | |

OTHER PUBLICATIONS

Russakovsky, Alexander; "Hopping over Big Data: Accelerating Ad-hoc OLAP Queries with Grasshopper Algorithms" published Feb. 26, 2015, 30 pages.

Dynamic Flow process definition Nov. 26, 2018, google.com, hllps://www.google.com/search?biw=1920&bih=1076&ei=njv8W_CJD4mizwK_l4gCQ&q=%22dynamic+flow+process%22+definition&oq=%22dynamic•flow+process%22+definition&gs l=psy-ab .3 ... 38876 .39886 .. 40199 ... 0 .0 .. 0. 76.437 .8 ...... 0 .... 1 .. gws-.viz ....... Oi71 j0i7i30j0i30j0i8i30.

Dynamic Flow process OLAP Nov. 26, 2018, google.com, https://www.google.com/search?biw=1920&bih=1076&ei=njv8W_CJD4mizwK_l4gCQ&q=%22dynamic+flow+process%22+definition&oq=%22dynamic•flow+process%22+definition&gs l=psy-ab .3 ... 38876 .39886 .. 40199 ... 0 .0 .. 0. 76.437 .8 ...... 1 .. gws-.viz ....... Oi71j0i7i30j0i30j0i8i30j33i10.

PerformanceArchHowTo, Aggregate Storage Option ASO vs Block Storage Option BSO Contrast and Comparison Aug. 24, 2011, youtube.com, https://www.youtube.com/watch?v=i8AeH5UGT90.

ORACLE© , Oracle Enterprise Performance Management System Documentation, Release 11.1.2.4/ Essbase, Database Administrator's Guide, Developing Formulas for Block Storage Databases, Copyright© 2019, 28 pages.

Larimer, Mike et al., ORACLE, OAC Essbase Hybrid Block Storage Option Performance Tuning, White Paper, ORACLE© , Jun. 11, 2018, 24 pages.

ORACLE, Oracle® Cloud, Oracle Cloud Administering Oracle Essbase Cloud, Copyright© 1996, 2016, 632 pages.

ORACLE, Oracle® Cloud, Administering Oracle Analytics Cloud—Essbase, Copyright© 1996, 2017, 703 pages.

Essbase Information Development Team, Oracle® Cloud, Technical Reference for Oracle Analytics Cloud—Essbase, E70189 04, Sep. 2017, Copyright© 1996, 2017, 1044 pages.

EPM Information Development Team, Oracle® Essbase Release 11.1.1, Database Administrator's Guide, Copyright© 1996, 2008, 1182 pages EPM Information Development Team, Oracle® Essbase, Technical Reference, Release 11.1.2.2.100, Copyright© 1996, 2012, 1402 pages.

EPM Information Development Team, Oracle® Essbase Database Administrator's Guide, Release 11.1.2.2.100, Updated Dec. 2013, Copyright© 1996, 2013, 1138 pages.

Turrell, Jake, "Introduction to Essbase Hybrid Aggregation Mode", Mar. 4, 2015, 12 pages, retreived on Jan. 15, 2020 from: <http://turrellconsulting.com/blog/?s=introduction+to+essbase+hybrid+aggregation+mode&searchsubmit=U>.

* cited by examiner

US 11,226,987 B2

SYSTEM AND METHOD FOR IN-PLACE DATA WRITES TO REDUCE FRAGMENTATION IN A MULTIDIMENSIONAL DATABASE ENVIRONMENT

CLAIM OF PRIORITY

This application claims the benefit of priority to U.S. Provisional Application titled "SYSTEM AND METHOD FOR IN-PLACE DATA WRITES TO REDUCE FRAGMENTATION IN A MULTIDIMENSIONAL DATABASE ENVIRONMENT", Application No. 62/245,915; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to online analytical processing and multidimensional database computing environments, and to systems and methods for using of in-place data writes.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, described herein is a system and method for use with a multidimensional database (e.g., Essbase) computing environment. Particularly, a system and method are described for in-place data writes to a data storage medium associated with the multidimensional database computing environment. For instance, when multiple data updates from calculation scripts are associated with a same set of blocks, in-place data writes improve performance by not only reducing fragmentation of the data storage medium, but also limits index updates.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
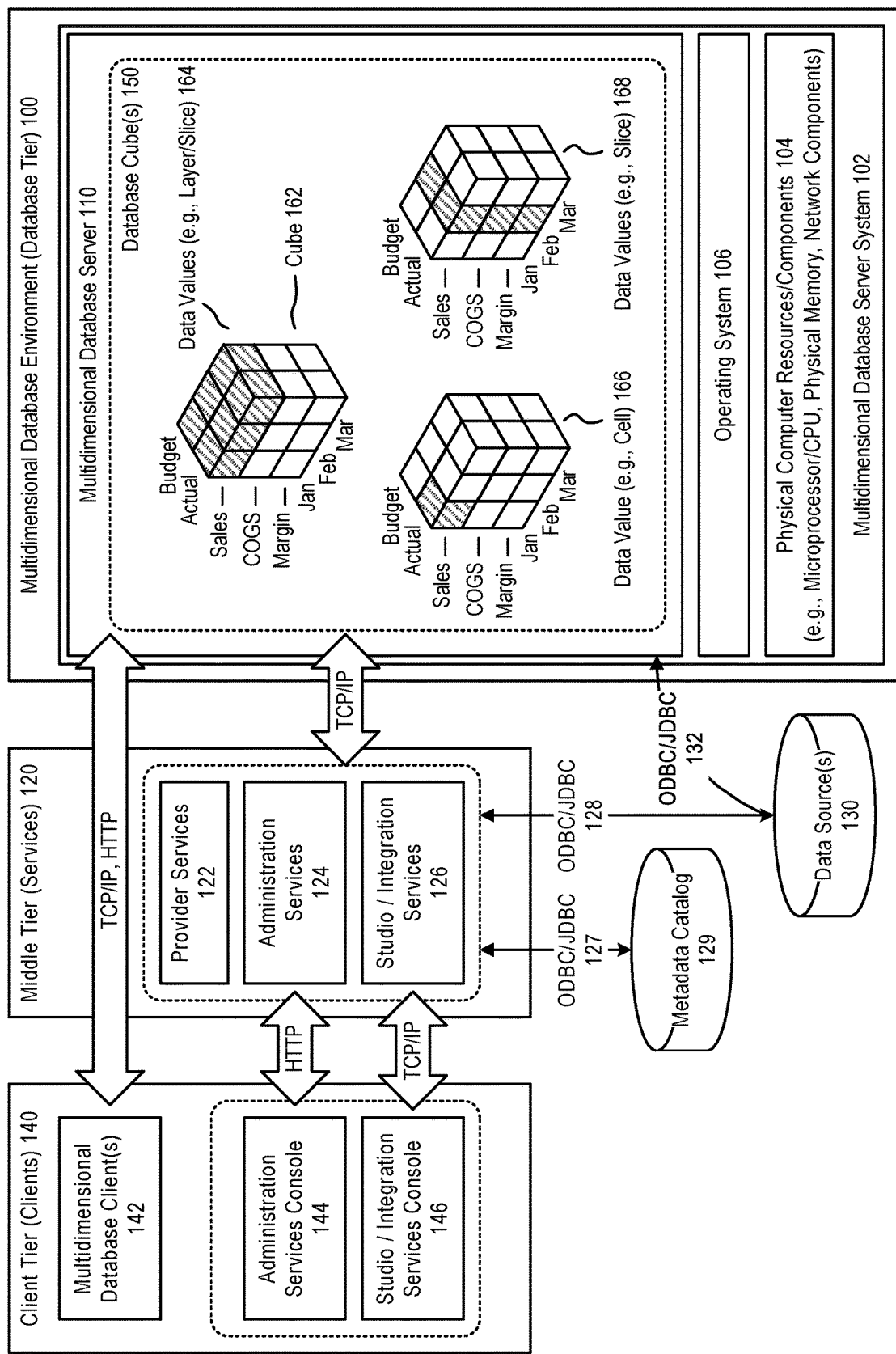
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information In-Place Data Writing (5680Us1)

In accordance with an embodiment, described herein is a system and method for use with a multidimensional database (e.g., Essbase) computing environment. Particularly, a system and method are described for in-place data writes to a data storage medium associated with the multidimensional database computing environment. For instance, when multiple data updates from calculation scripts are associated with a same set of blocks, in-place data writes improve performance by not only reducing fragmentation of the data storage medium, but also limits index updates.

In some multidimensional database computing environments, a data block is written to a new location when updated or modified. In general, this strategy involves finding free space on a storage medium, writing the data block to the free space and, upon successful completion of the write, updating an index entry with the new location of the data block. This approach, however, creates contention for free space, which is exacerbated when a thread private cache is depleted. Further, this process updates an index page and, thus, the index also needs to be written to the storage medium. An index update is an expensive process due to severe contention on the data structure. Moreover, as the data block is written to a new location, the old location is marked free. Over time, this leads to a fragmented database, which requires periodically defragmenting of the database leading to downtime and maintenance overhead.

In accordance with an embodiment, a multidimensional database environment can be extended to include support for in-place data writes. With in-place data writing, a current location of a data block is re-used whenever possible. For example, whenever a data block is ready to be written to disk, a new compressed size of the data block is determined. If the compressed data block fits within a current file location, that location is reused such that the block is updated in place.

To accommodate in-place data writes, the multidimensional database environment can be configured with a minimum compressed size threshold for a data block. This parameter can be pre-configured or based on statistics relevant for the data model. When a data block is smaller than the minimum compressed size, a free fragment of the minimum size is allocated for the block.

For data blocks that are larger than the minimum size, a pre-configured fudge factor can be added to the disk space allocation. This fudge factor can be expressed as a percent of the exact compressed size. For example, the fudge factor could be 20%, and for each disk allocation 20% more than requested is allocated to factor in any future growth. The actual percentage for the fudge factor can be configurable and is not limited to 20%.

Figure 2:
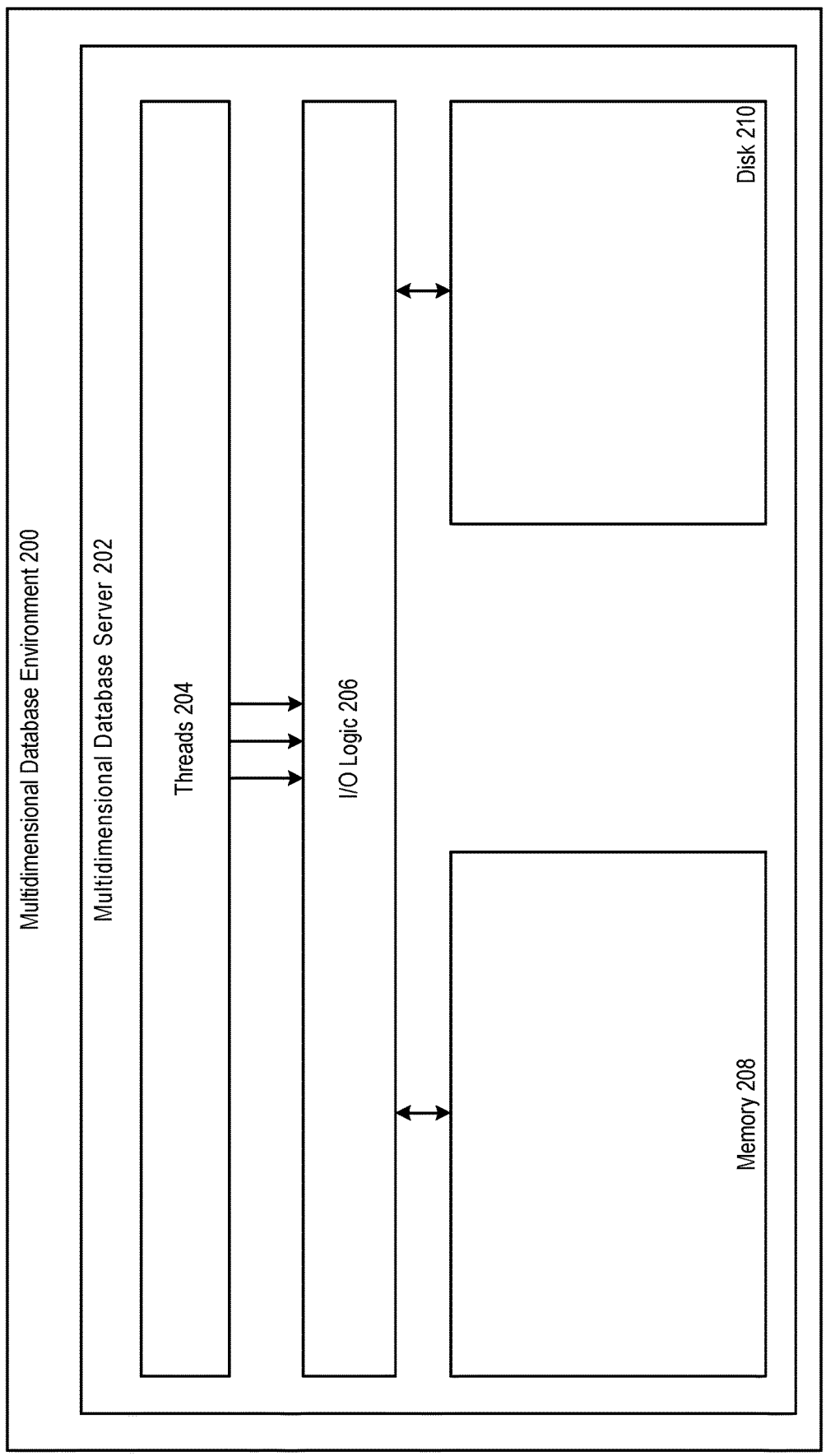
FIG. 2 illustrates in-place data writing within a multidimensional database environment in accordance with an embodiment.
Figure 3:
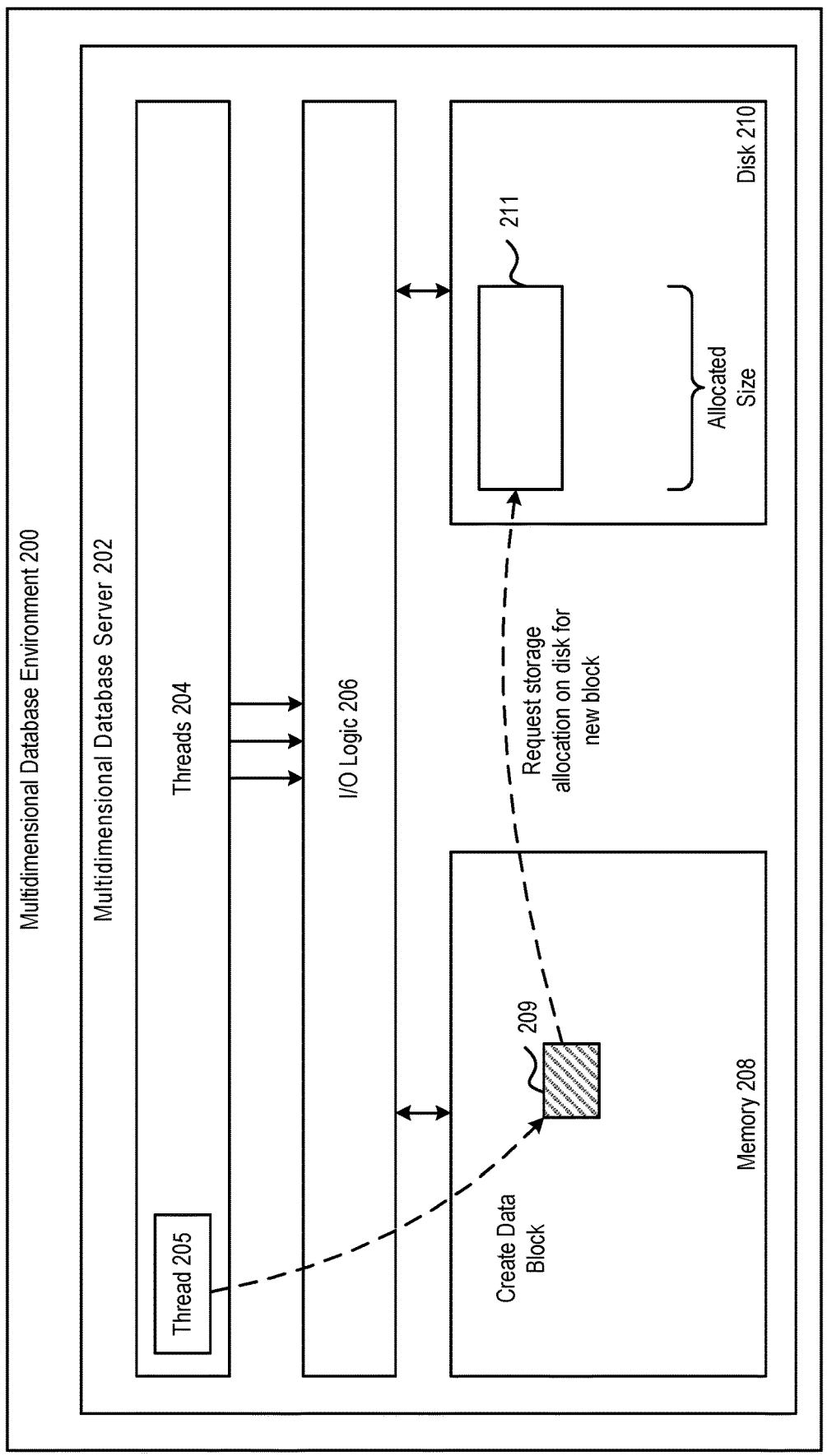
FIG. 3 further illustrates in-place data writing within a multidimensional database environment in accordance with an embodiment.
Figure 4:
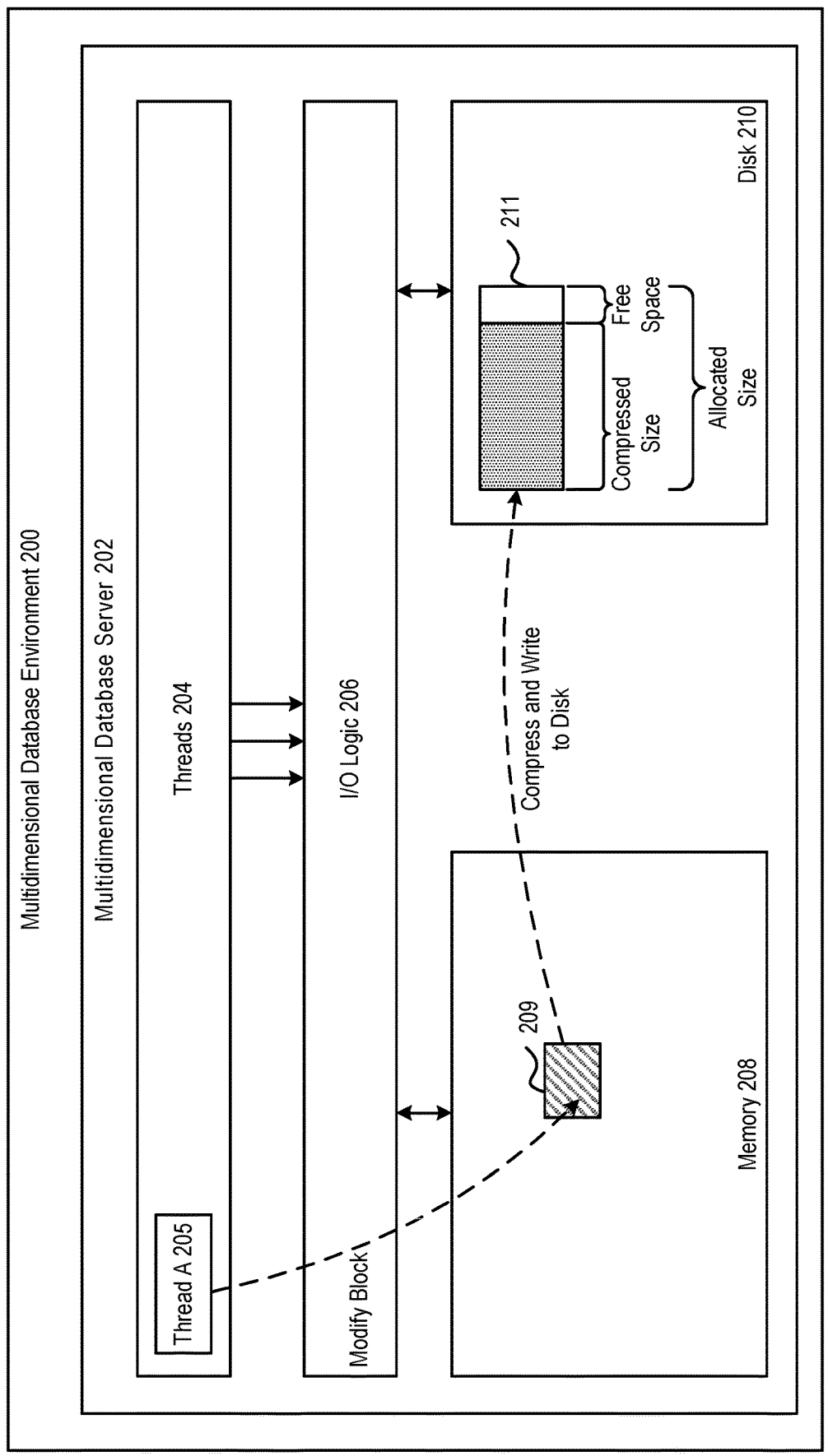
FIG. 4 further illustrates in-place data writing within a multidimensional database environment in accordance with an embodiment.

FIGS. 2-4 illustrates in-place data writing within a multidimensional database environment in accordance with an embodiment.

Turning initially to FIG. 2, a multidimensional data environment 200 is depicted. The environment 200 can include a database server 202. According to an example, the database server 202 can include a plurality of processing cores or provide a multi-threaded environment so as to enable concurrency. As such, database server 202 supports a plurality of threads 204 that can concurrently execute.

For instance, threads 204 can concurrently perform calculations, data loads, or other operations on a multidimensional database. In particular, threads 204 operate on data blocks stored in a data cache of memory 208 of database server 202.

In accordance with an embodiment, the data cache stores data blocks in an uncompressed state. When a block is updated, it is flagged so that the block can be persisted to a data storage medium such as disk 210. Disk 210 can be hard disk, a solid state drive, flash memory, a network file system, or other remote storage. On disk 210, data blocks are stored in a compressed state.

Threads 204 can utilize I/O Logic 206 to write data blocks to disk 210 and/or read data block from disk 210 to memory 208. In accordance with an example, I/O Logic 206 can include various application program interfaces (APIs) provided by the multidimensional database environment 200 and/or an operating system. As described herein, I/O Logic 206 can be utilized to allocate space on disk 210 to write data blocks and to effect actual writing of data blocks.

Turning to FIG. 3, as shown, a thread 205 can create a new data block 209 of the multidimensional database in memory 208. For example, data block 209 could be a previously empty data block in which thread 205 loads new data. Further, data block 209 could be an existing data block that has yet to be persisted to disk 210 and/or needs to be written to a new location.

Based on a compressed size of data block 209, thread 205 can utilize I/O logic 206 to request a fragment of free space on disk 210 to be allocated for a data file 211 employed to store block 209. In accordance with an embodiment, the requested fragment can correspond to a minimum data block size. The minimum data block size can be a configurable parameters of the multidimensional database environment 200. The minimum data block size provides for allocated data files on disk 210 that enable data growth for a data block even when the data block is initially small. A free space allocation of the minimum data block size is allocated when a compressed size of data block 209 is less than this threshold.

In another example, the requested fragment can correspond to the compressed size of data block 209, plus an additional amount. For instance, data file fragment 211 can be sized so as to provide additional free space for the data block 209 to grow. The additional amount, according to an embodiment, can be a predetermined percentage of the compressed size of data block 209.

In FIG. 4, thread 205 can modify or update data block 209 in memory 208. Due to the modification, data block 209 is flagged to be persisted to disk 210. That is data block 209 is compressed and written to disk 210. Data block 209 can correspond to a location 211 on disk 210. As shown, location 211 has an allocated size that is greater than a compressed size of data block 209, leaving an amount of allocated free space at location 211. When the allocated size of location 211 is greater than the compressed size of data block 209, the compressed data block is written to the same location. When the allocated size of location 211 is unable to accommodate the compressed size of data block 209, a new location is requested on disk 210 to store the block 209, as described above in connection with FIG. 3.

Figure 5:
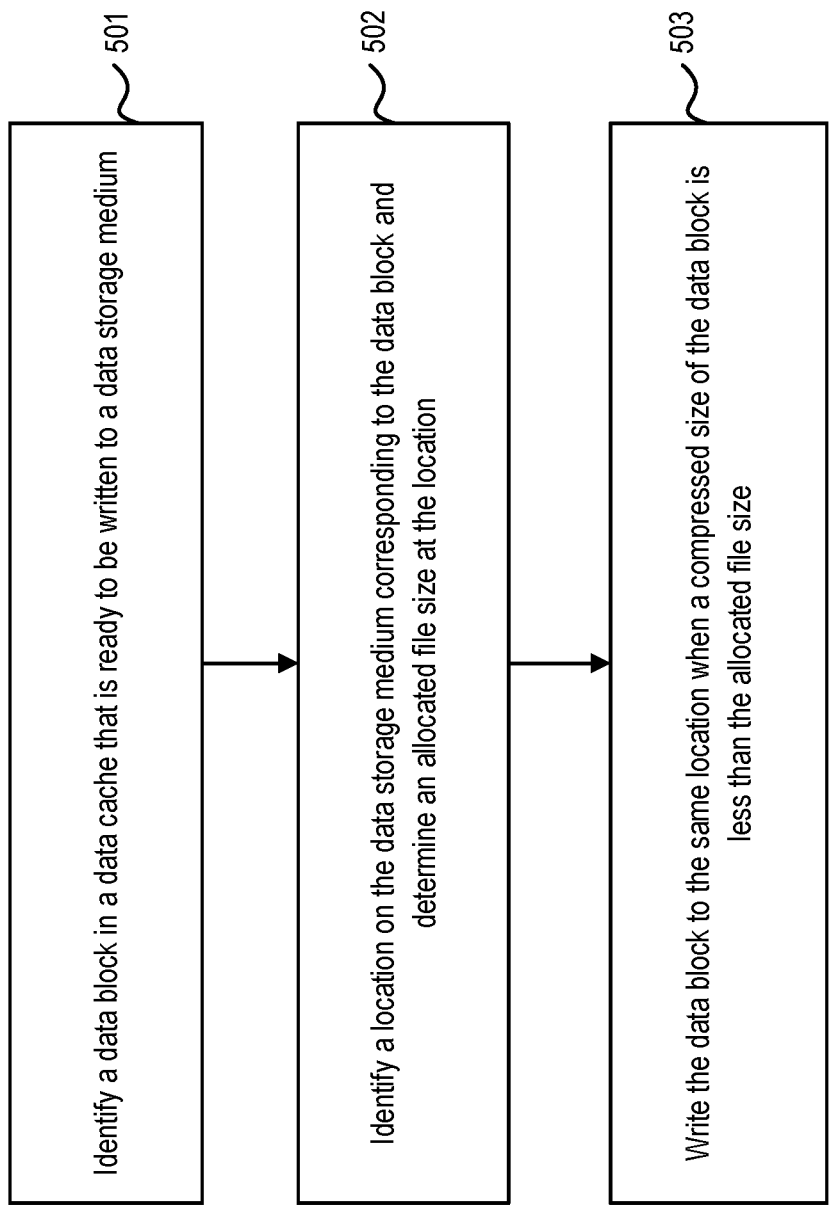
FIG. 5 illustrates a flowchart describing in-place data writing within a multidimensional database environment in accordance with an embodiment.
Figure 6:
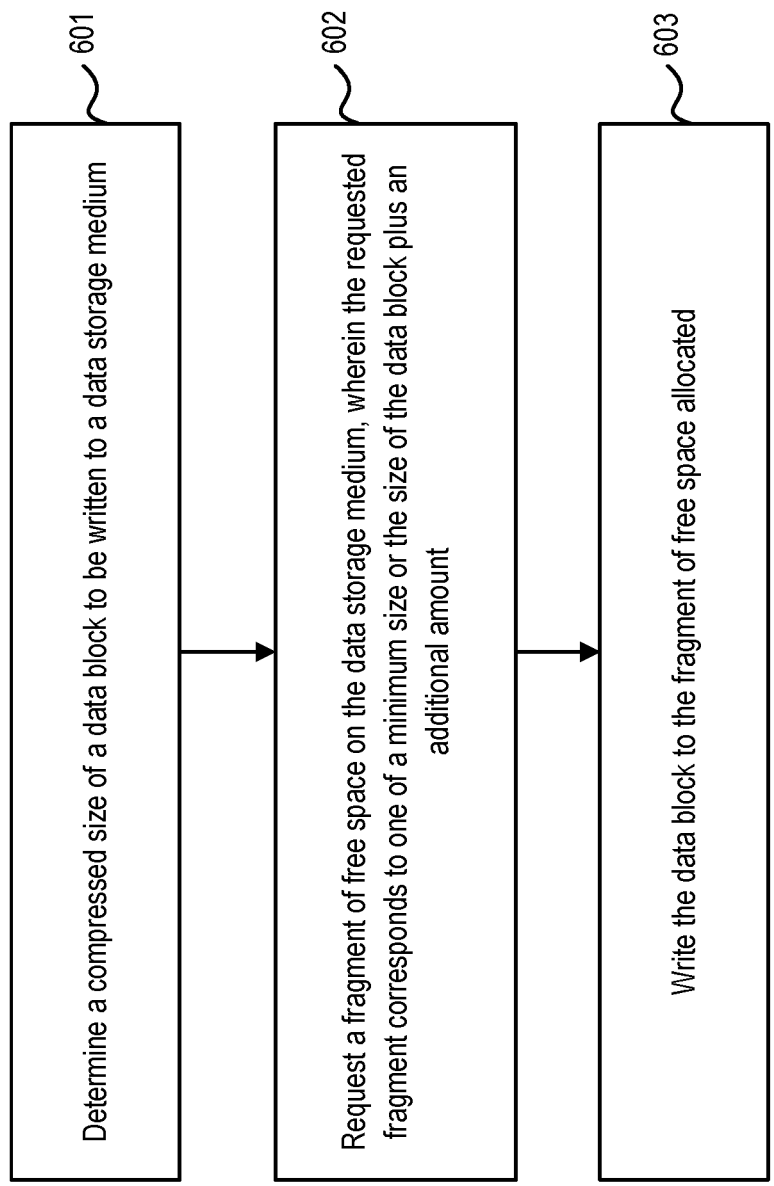
FIG. 6 illustrates a flowchart further describing in-place data writing within a multidimensional database environment in accordance with an embodiment.

FIGS. 5-6 illustrates flowcharts describing in-place data writing within a multidimensional database environment in accordance with an embodiment. FIG. 5 illustrates a flow chart for an in-place write of a data block in a multidimensional database environment. At step 501, a data block in a data cache is identified that is ready to be written to a data storage medium.

At step 502, a location on the data storage medium, corresponding to the data block, is identified. Further, an allocated file size at the location is determined.

At step 503, the data block is compressed and written to the same location on the data storage medium when a compressed size of the block is less than the allocated file size at the location.

Turning to FIG. 6, when a new location on the data storage medium needs to be requested, for example when a data block does not fit into an existing allocated space, then a compressed size of the data block to be written to the data storage medium is determined as shown at step 601.

At step 602, a fragment of free space on the data storage medium is requested. The requested fragment corresponds to one of a minimum size or the size of the data block plus an additional amount.

At step 603, the data block is compressed and written to the fragment of free space allocated.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, while many of the embodiments described herein illustrate the use of an Oracle Essbase multidimensional database environment, in accordance with various embodiments the components, features, and methods described herein can be used with other types of online analytical processing or multidimensional database computing environments.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A multidimensional database server system for performing in-place data writes in a multidimensional database, comprising:
   a data storage medium;
   a memory;
   a processor; and
   wherein the multidimensional database server is configured to:
      create a plurality of data blocks wherein each of the plurality of data blocks comprises a multidimensional array of data values for each unique combination of sparse standard dimension members of the multidimensional database;
      create an index identifying a location for each of the plurality of data blocks wherein the index represents the unique combination of sparse standard dimension members for each of the plurality of data blocks and a pointer to a corresponding identified location for each unique combination of sparse standard dimension members for which at least one data value exists in said each of the plurality of data blocks;
      store the plurality of data blocks in a compressed state in the data storage medium;
      store the plurality of data blocks in an uncompressed state in a data cache in the memory;
      identify a data block, associated with a particular unique combination of sparse standard dimension members, in the data cache flagged for writing to the data storage medium;
      compress the data block to generate a compressed data block;
      determine a file size of the compressed data block;
      identify, from the index, using the particular unique combination of sparse standard dimension members, a particular identified location on the data storage medium corresponding to the data block and determine an allocated file size for the data block at the particular identified location;
      upon a determination that the file size of the compressed data block is smaller than or equal to the allocated file size for the data block at the particular identified location, write the compressed data block to the particular identified location on the data storage medium; and upon a determination that the file size of the compressed data block is larger than the allocated file size for the data block at the particular identified location, allocating a free custom-size fragment of the data storage medium that is equal in size to the file size of the compressed data block plus an additional amount of storage space at a new location, writing the compressed data block to the free custom-size fragment at the new location on the data storage medium, and updating the index to with respect to the particular unique combination of sparse standard dimension members to identify the new location on the data storage medium for the data block.

2. The system of claim 1, wherein, when storing the plurality of data blocks in a compressed state in the data storage medium, the multidimensional database server is further configured to request allocation of storage space on the data storage medium for each of the plurality of data blocks.

3. The system of claim 1, wherein the additional amount of storage space is configurable within the multidimensional database environment.

4. The system of claim 1, wherein the additional amount of storage space is a percentage of the compressed size of the data block.

5. The system of claim 1, wherein the additional amount of storage space is twenty (20) percent of the compressed size of the data block.

6. A method for in-place writes in a multidimensional database in a multidimensional database environment comprising a processor, a memory and a data storage medium, the method comprising:

creating a plurality of data blocks wherein each of the plurality of data blocks comprises a multidimensional array of data values for each unique combination of sparse standard dimension members of the multidimensional database;

creating an index identifying a location for each of the plurality of data blocks wherein the index represents the unique combination of sparse standard dimension members for each of the plurality of data blocks and a pointer to a corresponding identified location for each unique combination of sparse standard dimension members for which at least one data value exists in said each of the plurality of data blocks;

storing the plurality of data blocks in a compressed state in the data storage medium;

storing the plurality of data blocks in an uncompressed state in a data cache in the memory;

identifying a data block, associated with a particular unique combination of sparse standard dimension members, in a data cache of a multidimensional database that is flagged for writing to the data storage medium;

compressing the data block to generate a compressed data block;

determining a file size of the compressed data block;

identifying, from the index, using the particular unique combination of sparse standard dimension members, a particular identified location on the data storage medium corresponding to the data block;

determining an allocated file size for the data block at the particular identified location;

writing the compressed data block to the particular identified location on the data storage medium upon a determination that the file size of the compressed data block is smaller than or equal to the allocated file size for the data block at the particular identified location;

upon a determination that the file size of the compressed data block is larger than the allocated file size for the data block at the particular identified location, allocating a free custom-size fragment of the data storage medium that is equal in size to the file size of the compressed data block plus an additional amount of storage space at a new location, writing the compressed data block to the free custom-size fragment at the new location on the data storage medium, and updating the index with respect to the particular unique combination of sparse standard dimension members to identify the new location on the data storage medium for the data block.

7. The method of claim 6, further comprising:

reading the data block into the data cache from the free minimum-size fragment;

updating the data block;

determining, after the update, that the compressed size of the data block is smaller than, or equal to, the size of the free minimum-size fragment of the data storage medium; and rewriting the updated data block to the free minimum-size fragment of the data storage medium.

8. The method of claim 6, wherein the additional amount of storage space is configurable within the multidimensional database environment.

9. The method of claim 6, wherein the additional amount of storage space is a percentage of the file size of the compressed data block.

10. The method of claim 9, wherein the additional amount of storage space is twenty (20) percent of the file size of the compressed data block.

11. A non-transitory computer-readable storage medium having instructions stored thereon for supporting in-place writes in a multidimensional database in a multidimensional database environment comprising a processor, a memory and a data storage medium, which instructions, when read and executed, cause the multidimensional database environment to perform steps comprising:

creating a plurality of data blocks wherein each of the plurality of data blocks comprises a multidimensional array of data values for each unique combination of sparse standard dimension members of the multidimensional database;

creating an index identifying a location for each of the plurality of data blocks wherein the index represents the unique combination of sparse standard dimension members for each of the plurality of data blocks and a pointer to a corresponding identified location for each unique combination of sparse standard dimension members for which at least one data value exists in said each of the plurality of data blocks;

storing the plurality of data blocks in a compressed state in the data storage medium;

storing the plurality of data blocks in an uncompressed state in a data cache in the memory;

identifying a data block, associated with a particular unique combination of sparse standard dimension members, in a data cache of a multidimensional database that is flagged for writing to the data storage medium;

compressing the data block to generate a compressed data block;

determining a file size of the compressed data block;

identifying, from the index, using the particular unique combination of sparse standard dimension members, a particular identified location on the data storage medium corresponding to the data block;

determining an allocated file size for the data block at the particular identified location;

writing the compressed data block to the particular identified location on the data storage medium upon a determination that the file size of the compressed data block is smaller than or equal to the allocated file size for the data block at the particular identified location; and upon a determination that the file size of the compressed data block is larger than the allocated file size for the data block at the particular identified location,
  allocating a free custom-size fragment of the data storage medium that is equal in size to the file size of the compressed data block plus an additional amount of storage space at a new location,
  writing the compressed data block to the free custom-size fragment at the new location on the data storage medium, and
  updating the index with respect to the particular unique combination of sparse standard dimension members to identify the new location on the data storage medium for the data block.

12. The non-transitory computer-readable medium of claim 11, wherein the additional amount of storage space is configurable within the multidimensional database environment.

13. The non-transitory computer-readable medium of claim 11, wherein the additional amount of storage space is a percentage of the file size of the compressed data block.

14. The non-transitory computer-readable medium of claim 11, wherein the additional amount of storage space is twenty (20) percent of the file size of the compressed data block.

* * * * *

UNITED STATES PATENT AND TRADEMARK OFFICE
CERTIFICATE OF CORRECTION

PATENT NO. : 11,226,987 B2
APPLICATION NO. : 15/332969
DATED : January 18, 2022
INVENTOR(S) : Ramaiyer et al.

It is certified that error appears in the above-identified patent and that said Letters Patent is hereby corrected as shown below:

On the Title Page

On page 2, Column 2, item (56) under Other Publications, Line 5, delete "hllps://" and insert -- https:// --, therefor.

In the Specification

In Column 5, Line 37, delete "Us1)" and insert -- US1) --, therefor.

In the Claims

In Column 9, Line 16, in Claim 1, delete "to with" and insert -- with --, therefor.

Signed and Sealed this
Twenty-fourth Day of May, 2022

Katherine Kelly Vidal
*Director of the United States Patent and Trademark Office*